(12) United States Patent
Tang

(10) Patent No.: US 8,111,925 B2
(45) Date of Patent: Feb. 7, 2012

(54) SYSTEM AND METHOD FOR IDENTIFYING OBJECT IN IMAGE

(75) Inventor: Pei-Chong Tang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 908 days.

(21) Appl. No.: 12/138,433

(22) Filed: Jun. 13, 2008

(65) Prior Publication Data

US 2009/0034841 A1 Feb. 5, 2009

(30) Foreign Application Priority Data

Aug. 1, 2007 (CN) .......................... 2007 1 0201240

(51) Int. Cl.
G06K 9/46 (2006.01)
G06K 9/66 (2006.01)
G06K 9/36 (2006.01)
G06K 9/34 (2006.01)

(52) U.S. Cl. ........ 382/194; 382/173; 382/190; 382/203; 382/288

(58) Field of Classification Search ................. 382/173, 382/190, 192, 194, 195, 203, 288, 289, 291, 382/209

See application file for complete search history.

(56) References Cited

U.S. PATENT DOCUMENTS

| 3,801,775 | A | * | 4/1974 | Acker | 235/470 |
| 4,593,406 | A | * | 6/1986 | Stone | 382/288 |
| 4,748,676 | A | * | 5/1988 | Miyagawa et al. | 382/288 |
| 6,915,565 | B2 | | 7/2005 | Isogai et al. | |
| 7,499,049 | B2 | * | 3/2009 | Cooke | 345/419 |
| 2007/0071287 | A1 | * | 3/2007 | Sugita et al. | 382/117 |

FOREIGN PATENT DOCUMENTS

JP 2-122380 A 5/1990

* cited by examiner

*Primary Examiner* — John Strege

(74) *Attorney, Agent, or Firm* — Altis Law Group, Inc.

(57) ABSTRACT

According to one aspect, a method for identifying an object in an image includes steps of determining a center of the object; calculating a radius for scanning the image; scanning along a scan circle defined by the center and the radius; and identifying the object according to scanned data of the image along the scan circle.

19 Claims, 17 Drawing Sheets

SYSTEM AND METHOD FOR IDENTIFYING OBJECT IN IMAGE

BACKGROUND

1. Field of the Invention

The present invention generally relates to a system and a method for identifying an object in an image.

2. Description of Related Art

Image capturing is widely used in industrial production, consumer electronics, and medical equipments. Take surface mounting technology (SMT) as an example, surface mount technology is a method for constructing electronic circuits in which surface mounted components (SMC) are mounted directly onto a surface of a printed circuit board (PCB). During the process of mounting the SMC onto the PCB, an image of the SMC is captured.

The image is analyzed to identify the SMC in the image and detect whether the SMC is correctly positioned. If it is detected that the SMC is misaligned, a nozzle for mounting the SMC can be adjusted according to the misalignment of the SMC to the PCB.

A conventional method for analyzing the image to identify an object (e.g., the SMC) in the image is by comparing the image of the object with a pre-captured standard image of the object, pixel by pixel. As a result of this comparison, properties of the object can be obtained, such as size, shape, offset, skew (i.e., rotated angle with respect to the object in the pre-captured standard image), etc.

However, when the file size of the image is large, it takes a relatively long time to complete the comparison.

Therefore, a need exists for a system and method for identifying the object in the image resolving the above problem in the industry.

SUMMARY

According to one aspect, a method for identifying an object in an image includes steps of determining a center of the object; calculating a radius for scanning the image; scanning along a scan circle defined by the center and the radius; and identifying the object according to scanned data of the image along the scan circle.

According to another aspect, a system for identifying an object in an image includes a center calculating module for calculating a center of the object, a radius calculating module for calculating a radius for scanning the image, and a comparing unit for comparing scanned data scanned along a scan circle defined by the center and the radius with predefined data to identify the object in the image.

Other systems, methods, features, and advantages of the present system and method for identifying an object in an image will be or become apparent to one with skill in the art upon examination of the following drawings and detailed description. It is intended that all such additional systems, methods, features, and advantages included within this description, be within the scope of the present device, and be protected by the accompanying claims.

BRIEF DESCRIPTION OF THE DRAWINGS

Many aspects of the present system and method for identifying an object in an image can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE EMBODIMENTS

Reference will now be made to the drawings to describe exemplary embodiments of a present system and method for identifying an object in an image, in detail.

Figure 1:
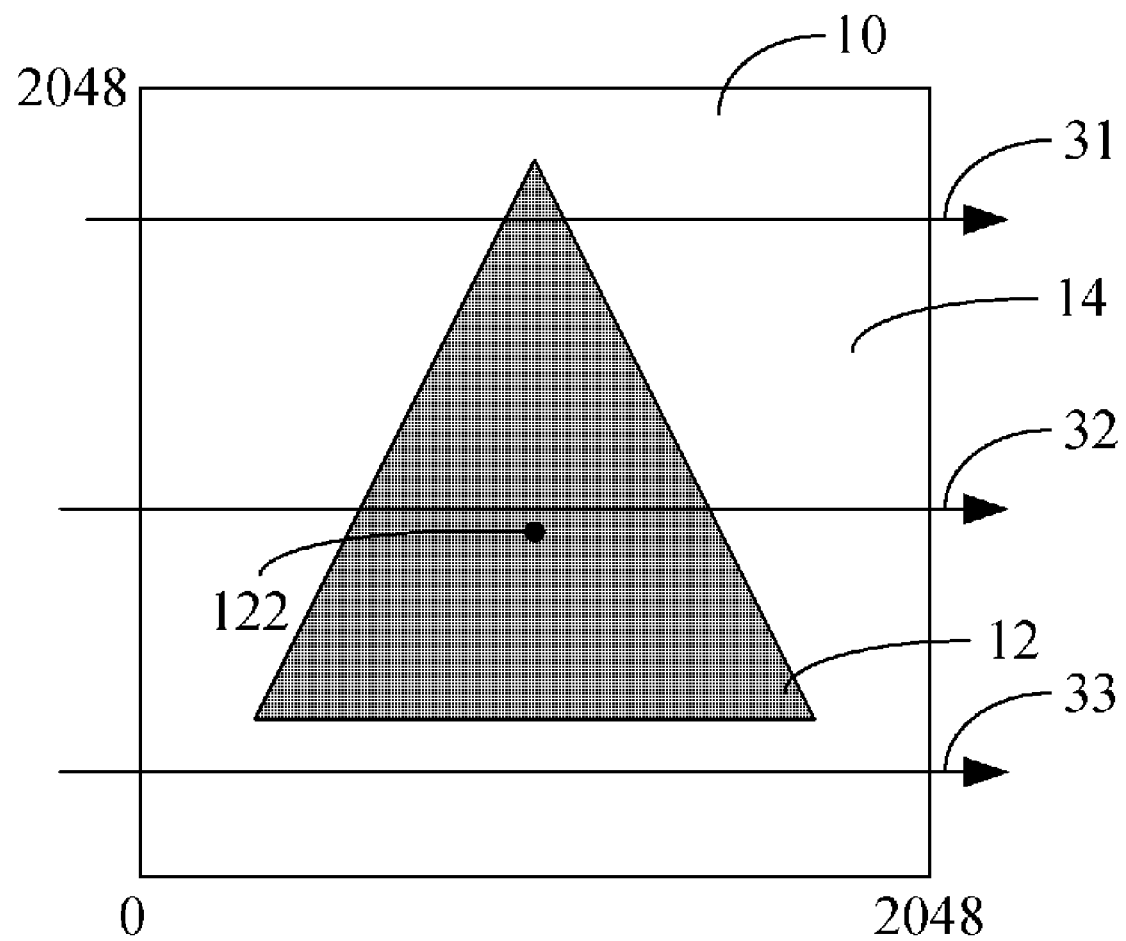
FIG. 1 shows an image and three scan lines for scanning the image.

FIG. 1 shows an image 10 including an object 12 and a background 14. In order to simplify the description of the present embodiment, the image 10 is monochrome and the object 12 is a triangle. In other alternative embodiments, the object can be a rectangle, or other regular or irregular shapes.

Figure 2:
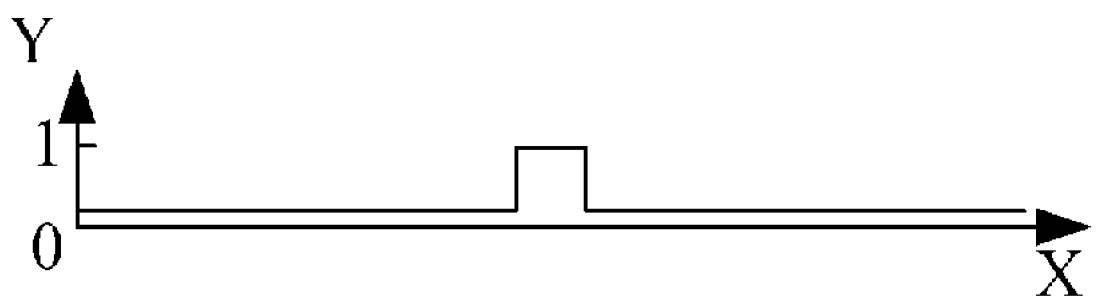
FIG. 2 shows relationships between recorded values of pixels along a first scan line and horizontal locations of the pixels in the image.
Figure 3:
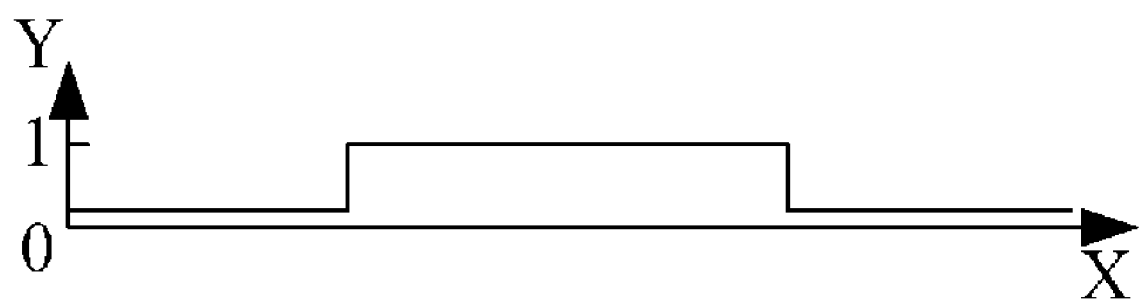
FIG. 3 shows relationships between recorded values of pixels along a second scan line and horizontal locations of the pixels in the image.
Figure 4:
FIG. 4 shows relationships between recorded values of pixels along a third scan line and horizontal locations of the pixels in the image.

First, a center 122 of the object 12 is computed. The image 10 is scanned line by line to record a value of each pixel in the image 10. For simplicity and to better describe the present embodiment, the image is in monochrome, and a black pixel represents a pixel value of 1 and a white pixel represents a pixel value of 0. That is, a value of the pixel of the object 12 in black is 1, while a value of the pixel of the background 14 in white is 0. FIG. 2 shows relationships between pixel values (Y-axis) along a scan line 31 and horizontal location (X-axis) of the pixels in the image 10. Along the scan line 31, pixels along both end sections of the scan line 31 (referring to FIG. 1) are background 14 of the image 10 and are white pixels, thus the values of the pixels at end sections are 0. Pixels along the middle section of the scan line 31 are of the object 12 and are black pixels, and the values of the pixels at the middle section are 1. Similarly, the pixel values along scan lines 32, 33 are correspondingly illustrated in FIGS. 3, 4, so as to determine whether scanned pixels in the image 10 are part of the object 12.

For example, when a resolution of the image 10 is 2048× 2048 pixels, there are 2048 scan lines with each of the scan line scans 2048 pixels. That is, 2048 values of 2048 pixels will be correspondingly obtained in each of the scan lines. When scanning, each location of the dark pixels is recorded. The location of the dark pixels is represented with a Y-coordinate (Yi) and an X-coordinate (Xi) in the image 10. The Y-coordinate is determined by the location of the scan line in the image, that is, pixels in a same scan line have same Y-coordinates. The X-coordinate is determined by the location of the pixel in the scan line. If the number of the dark pixels is N, a location of the center 122 can be calculated, wherein a Y-coordinate of the center 122 is ΣYi/N, and an X-coordinate of the center 122 is ΣXi/N.

Figure 5:
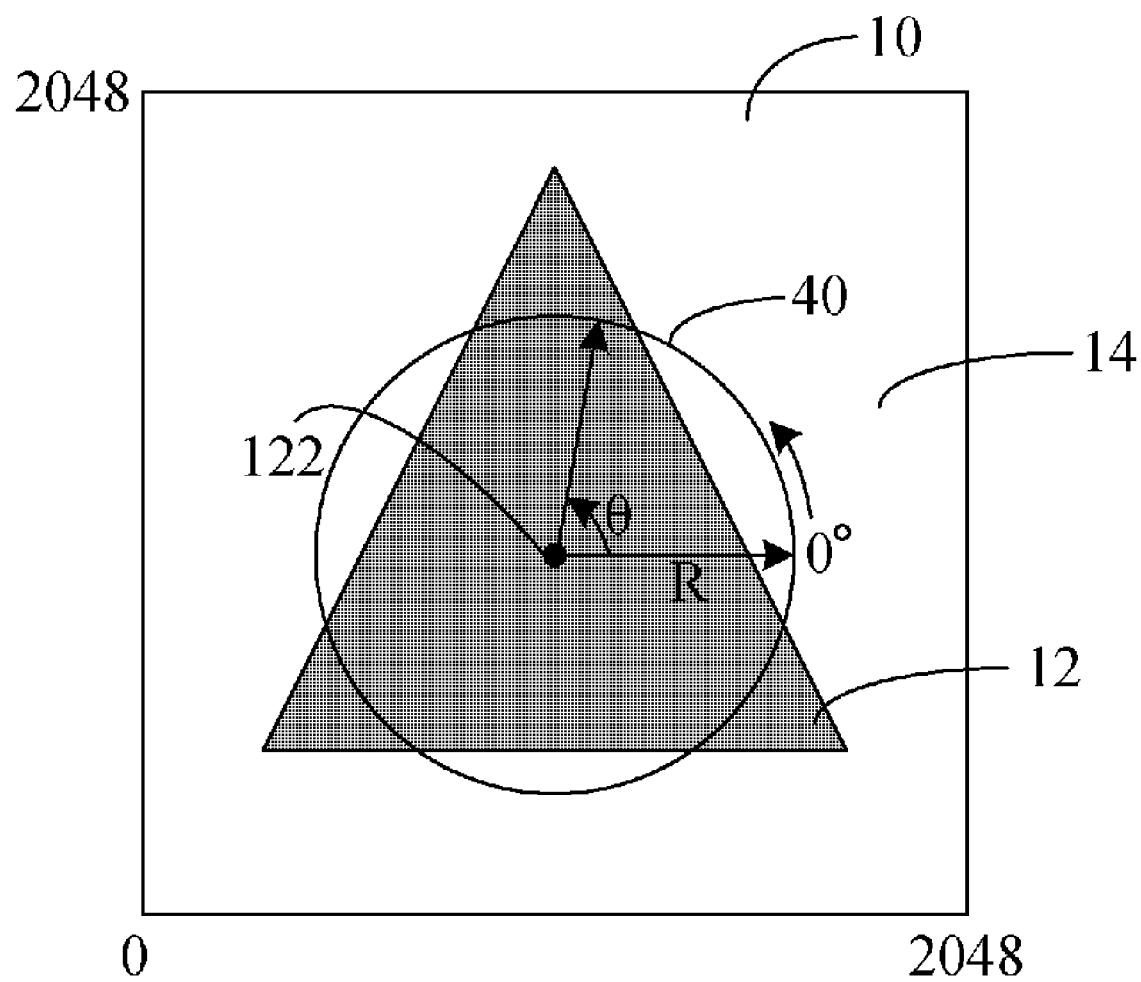
FIG. 5 shows an image including a triangle object and a scan circle for scanning the image.

Second, a radius of a scan circle is calculated. FIG. 5 shows the scan circle 40 defined by the center 122 and the radius R. The radius R is calculated via the following formula:

$$R = \sqrt{N/K};$$

wherein N represents the number of the pixels having the value of 1, K is a predetermined constant, for example, π, 3.5, or 0.9π.

Third, after the center 122 and the radius R of the scan circle is calculated, the image 10 is scanned along the circumference of the scan circle. That is, the values of the pixels along the circumference of the scan circle are read. A number of the pixels scanned along the circumference can be determined according to a desired precision. For example, if the number of the pixels is 2048, an increment of a central angle θ to scan a next pixel along the circumference is 2π/2048. Therefore, each pixel that is going to be scanned can be decided, and the location thereof can be calculated according the center 122, the radius R, and the central angle θ.

Figure 6:
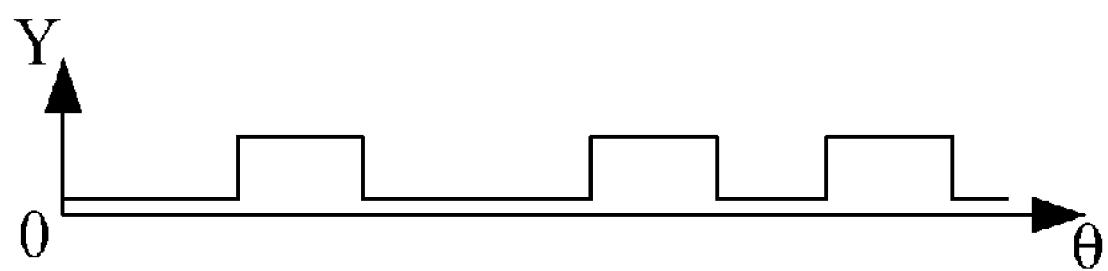
FIG. 6 shows an aggregate of the values of the pixels scanned along the circumference of the scan circle in FIG. 5.

Referring also to FIG. 6, the values of the pixels along the circumference of the scan circle 40 are shown. A first scanned pixel (i.e., the central angle θ equals to 0 degree) is part of the background 14, thus the value of the first pixel is 0. During the scan process, the central angle θ increases gradually (e.g., 2π/2048 per pixel). If the circumference of the scan circle 40 intersects on the object 12, the value of the scanned pixel is 1.

Figure 7:
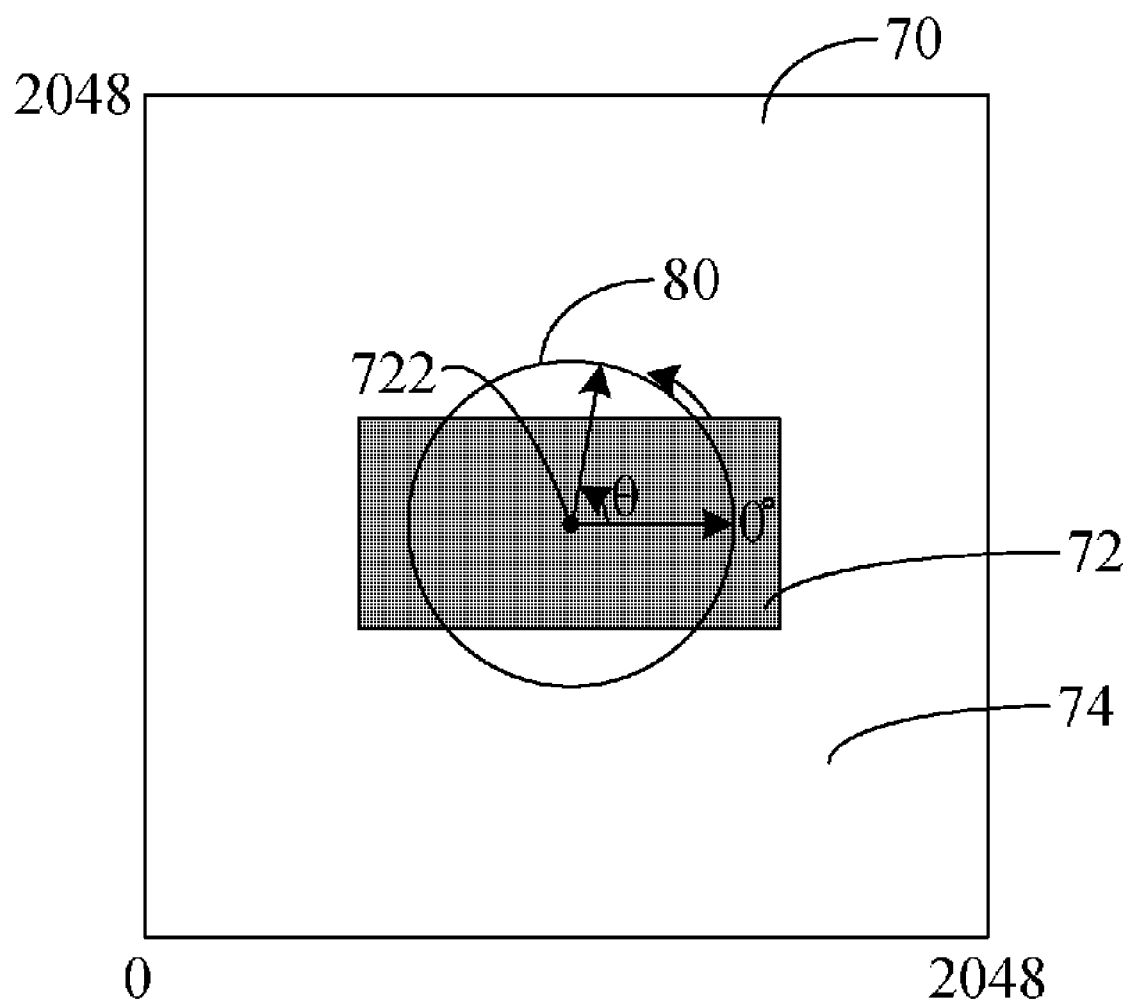
FIG. 7 shows an image including a rectangle object and a scan circle for scanning the image.
Figure 8:
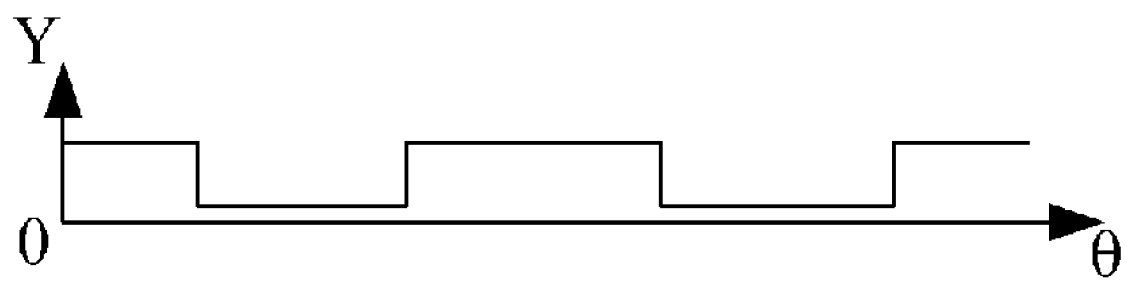
FIG. 8 shows an aggregate of the values of the pixels scanned along the circumference of the scan circle in FIG. 7.

Referring to FIG. 7, an image 70 includes an object 72 and a background 74. Similarly, a center 722 and a number of pixels of the object 72 can be calculated. Accordingly, a scan circle 80 for scanning the image 70 is determined by the center 722 and the number of pixels of the object 72. FIG. 8 shows an aggregate of the values scanned along the circumference of the scan circle 80.

Comparing FIG. 6 and FIG. 8, it's clear that the two aggregates of the two images 10, 70 are distinct. Therefore, images of different objects can be scanned employing the above described method to identifying the objects in the images by comparing the aggregate of the scanned values (i.e., scanned data) of the image with predefined aggregate data of standard images.

Figure 9:
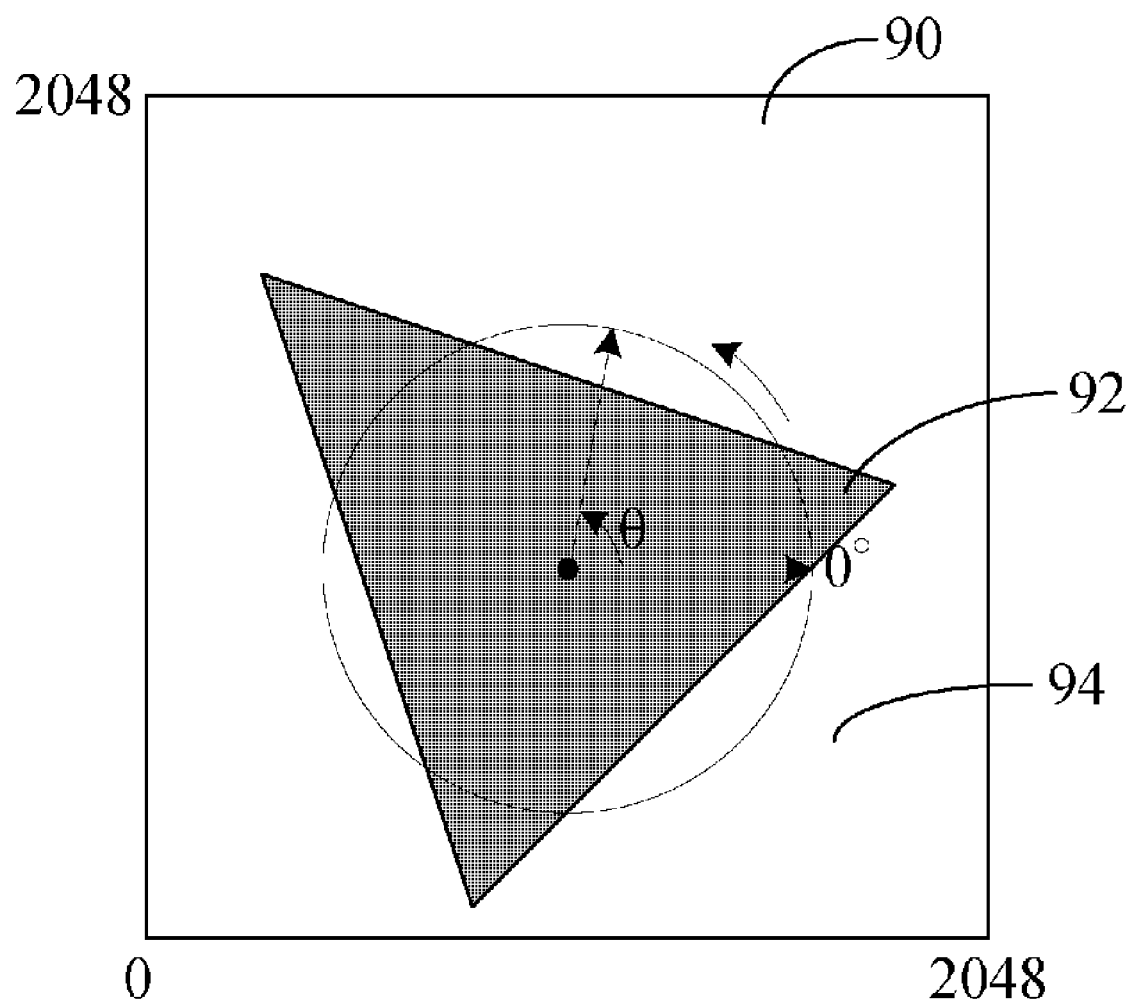
FIG. 9 shows an image including a rotated triangle object and a scan circle for scanning the image.
Figure 10:
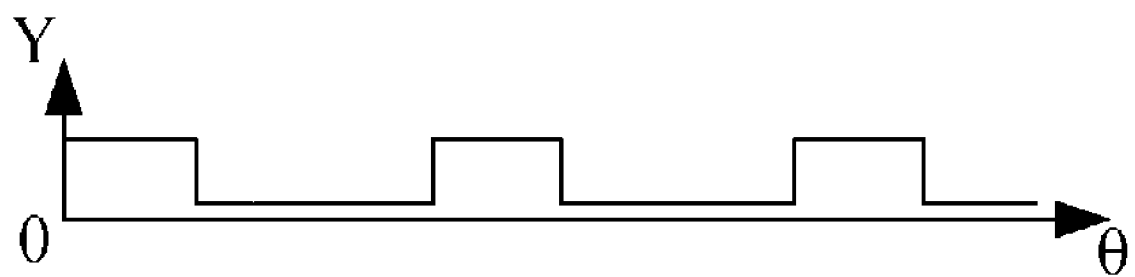
FIG. 10 shows an aggregate of the values of the pixels scanned along the circumference of the scan circle in FIG. 9.

Referring to FIG. 9, an image 90 includes an object 92 and a background 94. Compared to FIG. 6, the objects 12, 92 have a same size and shape, but the object 92 is rotated with an angle around a center of the object 92. Similarly, an aggregate of the values scanned employing the above described method is shown in FIG. 10. Comparing FIG. 6 and FIG. 10, a graph of the aggregate in FIG. 6 is similar to a graph of the aggregate in FIG. 10, but the graph of the aggregate in FIG. 10 has a different phase. That is, if an object is rotated, its graph of scanned aggregate will be the same as before except having a shifted phase.

Figure 11:
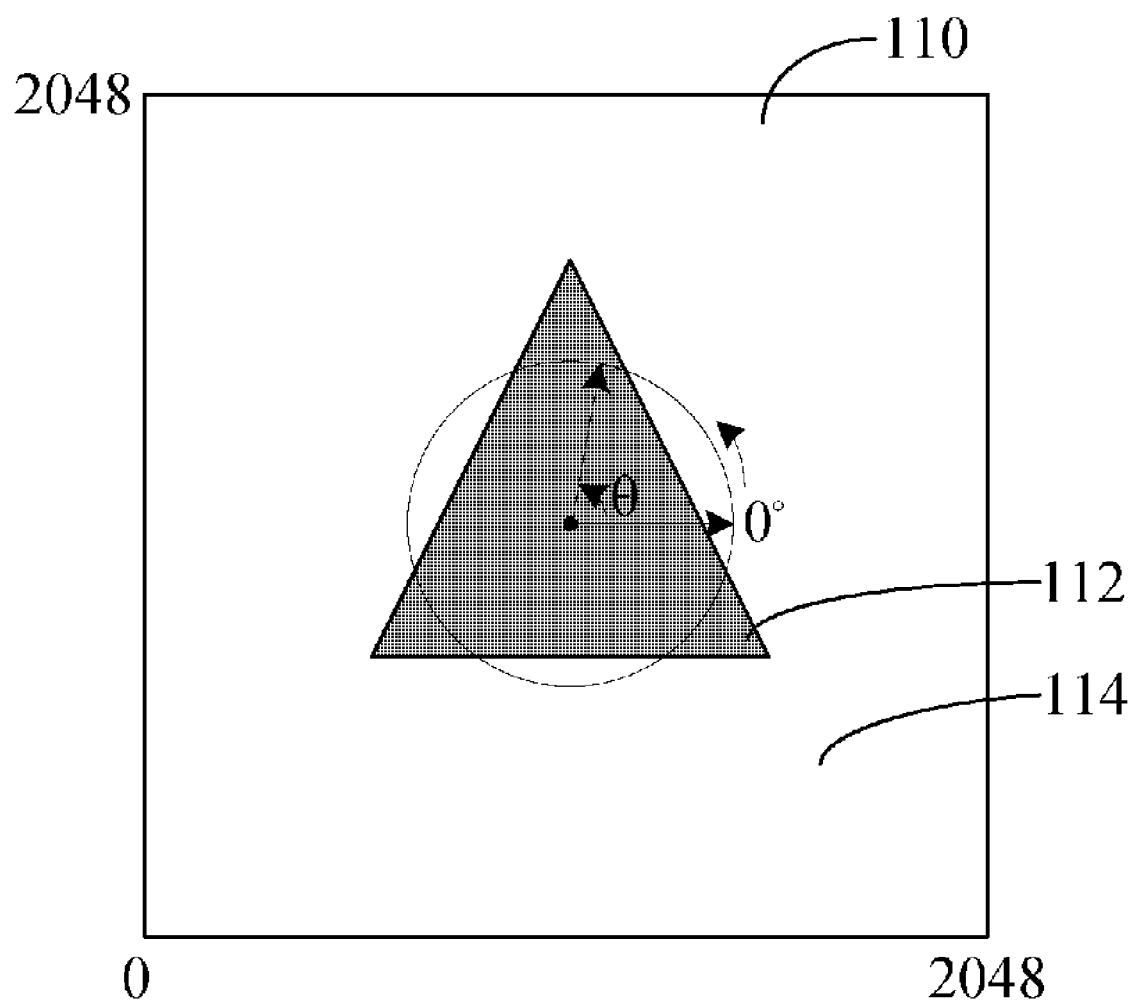
FIG. 11 shows an image including a smaller triangle object and a scan circle for scanning the image.
Figure 12:
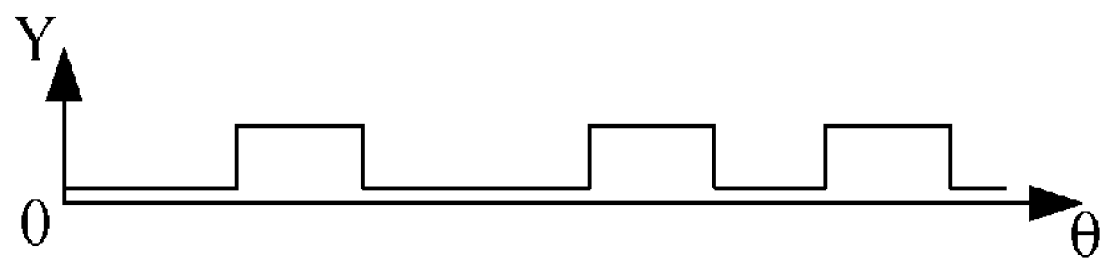
FIG. 12 shows an aggregate of the values of the pixels scanned along the circumference of the scan circle in FIG. 11.

Referring to FIG. 11, an image 110 includes an object 112 and a background 114. Comparing with FIG. 6, the objects 12, 112 have a same shape, but a size of the object 112 is smaller than that of the object 12. Similarly, an aggregate of the values scanned, employing the above described method, is shown in FIG. 12. Comparing FIG. 6 and FIG. 12, the shape of the graph of the aggregate in FIG. 12 is substantially the same as the shape of the graph of the aggregate in FIG. 6. However, different sizes of the objects 12, 112 will lead to generate different number of pixels of the objects 12, 112. Accordingly, the radii R of the different objects 12 and 112 when calculated from the formula $R = \sqrt{N/K}$ will be different. Therefore, different objects having different sizes can be identified by comparing the number of pixels or the radii R.

To sum up, the shape of an object in an image can be derived from the graph of the scanned values (i.e., aggregate of the scanned pixels). The rotated angle of the object can be calculated from the shifted phase of the graph. The size of the object can be determined by counting the number of pixels or calculating the radius R. If the object 12 in FIG. 5 is moved, the center 122 of the object will be moved accordingly. However, the graph of the scanned values, the phase of the graph, and the radius R will not change. Thus, the movement of the object 12 won't affect the identification of the object 12 in the image 10. In fact, the displacement of the object 12 can be calculated according to the location of the center 122.

Figure 13:
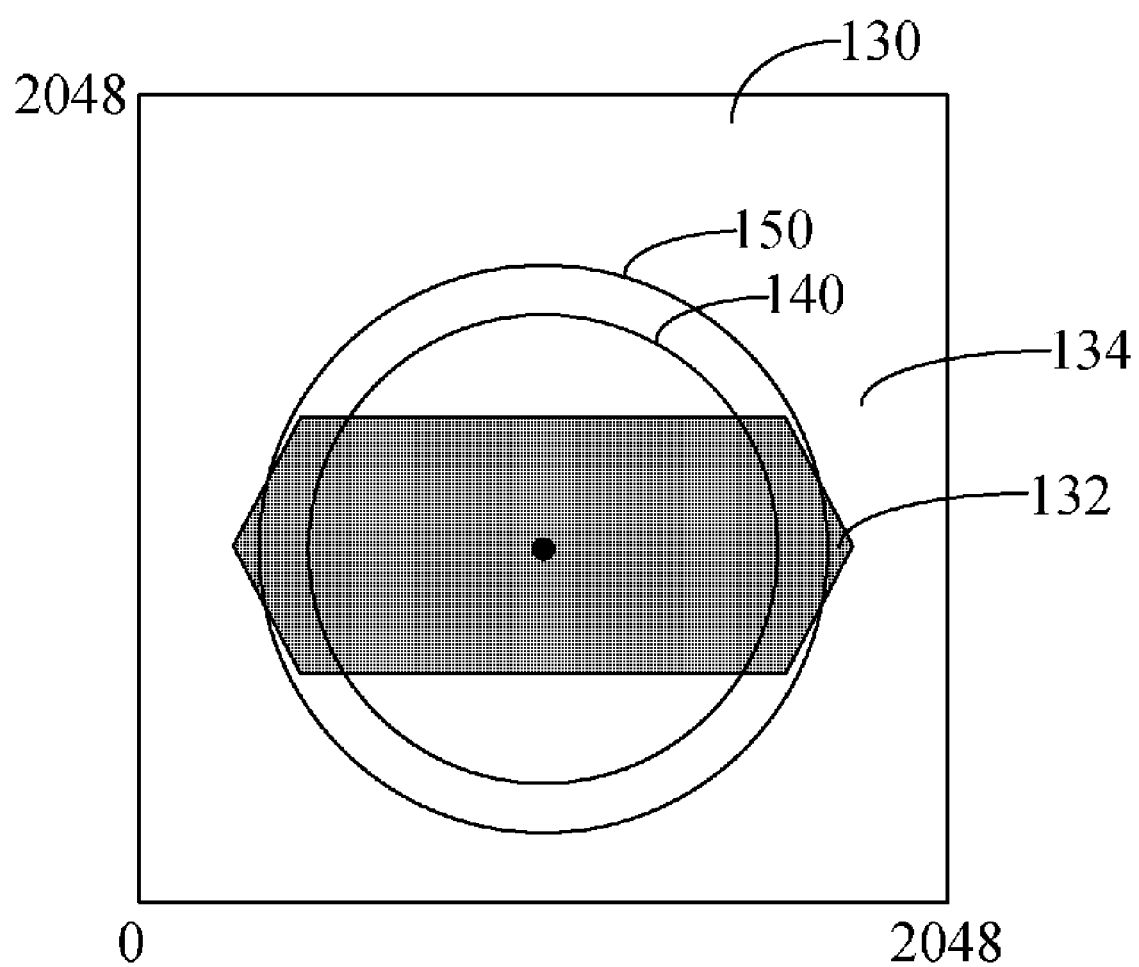
FIG. 13 shows an image including a polygon object and two scan circles for scanning the image.
Figure 14:
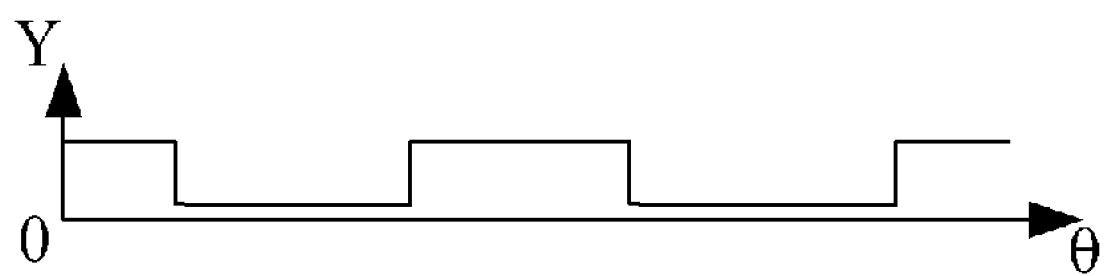
FIG. 14 shows an aggregate of the values of the pixels scanned along the circumference of a first scan circle in FIG. 13.
Figure 15:
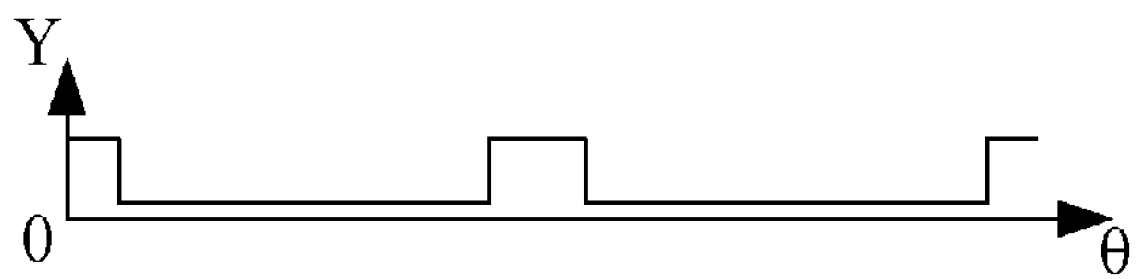
FIG. 15 shows an aggregate of the values of the pixels scanned along the circumference of a second scan circle in FIG. 13.

Furthermore, in order to more precisely identify the object, more than one scan circles can be employed to scan the image. FIG. 13 shows an image 130 including an object 132 and a background 134. Two scan circles 140, 150 for scanning the image 130 are determined by selecting two different constants K. The graphs obtained by the two scan circles 140, 150 are respectively shown in FIG. 14 and FIG. 15. Although FIG. 14 is similar to FIG. 8, it is still able to distinguish between the polygon object 132 and the rectangle object 72, as it is readily understood that the graph illustrated in FIG. 15 will be different from a graph obtained by another scan circle scanning the rectangle object 72.

Figure 16:
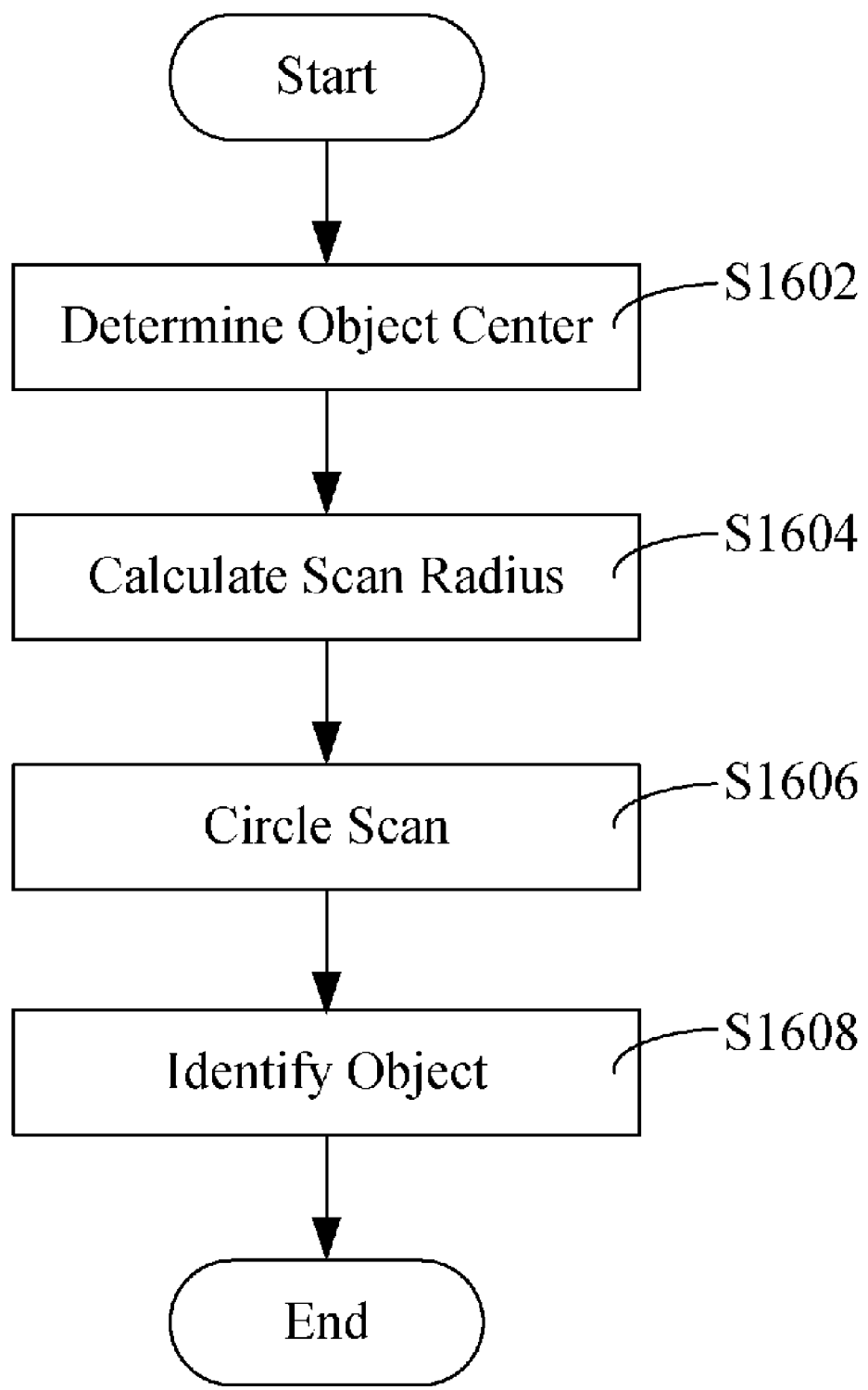
FIG. 16 is a flow chart of a method for identifying an object in an image.

A brief description of the method for identifying an object in an image will be given with reference to FIG. 16. In step S1602, a center of the object is determined. The center of the object is determined by the coordinates of each pixel of the object. That is, an X-coordinate of the center is an average value of the X-coordinates of pixels of the object, and a Y-coordinate of the center is an average value of the Y-coordinates of pixels of the object.

In step S1604, a radius for scanning the image is calculated. As mentioned above, the radius R is calculated via the following formula: $R = \sqrt{N/K}$; wherein N represents the number of pixels of the object, K is a predetermined constant, for example, π, 3.5, or 0.9π.

In step S1606, the image is scanned along a scan circle defined by the center and the radius. Each pixel that is going to be scanned can be determined according to the following formula:

$$A = A0 + dx + dy * W;$$

wherein A represents the location of the pixel that is going to be scanned, A0 represents the location of the center, dx represents a horizontal deviation from the center, dy represents a vertical deviation from the center, and W is a width of the image, for example, 2048 pixels. Generally, the image is linearly stored in a storage unit (e.g., random access memory, RAM) pixel by pixel according to addresses of the storage unit, other than planarly stored, thus one pixel increment along a vertical direction in the image will result that the address in the storage unit increases by the width of the image, rather than by one pixel.

In step S1608, the object in the image is identified according to the scanned data of the image along the scan circle. The scanned data are compared with predefined data to identify the object. For example, if the scanned data is similar to those of a triangle, the shape of the object is identified as the triangle. The location of the center determines the location of the object. The number of pixels of the object determines the size of the object. The phase difference between the scanned data and predefined data determines the rotate angle of the object.

Figure 17:
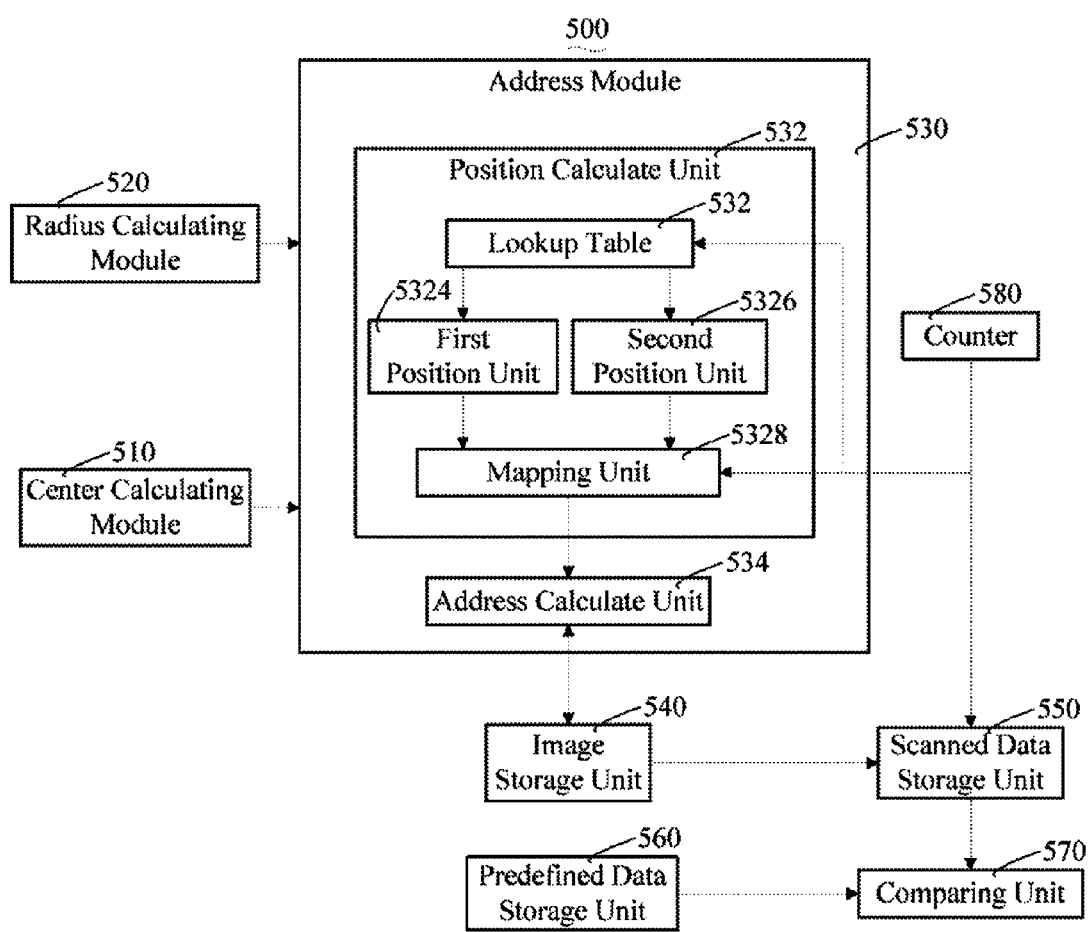
FIG. 17 is a block diagram of a system for identifying an object in an image in accordance with an exemplary embodiment.

Referring to FIG. 17, a system 500 for identifying an object in an image is illustrated. The system 500 includes a center calculating module 510, a radius calculating module 520, an address module 530, an image storage unit 540, a scanned data storage unit 550, a predefined data storage unit 560, a comparing unit 570, and a counter 580.

The center calculating module 510 is configured for calculating a center of the object. The center of the object is determined by the coordinates of each pixel of the object. That is, an X-coordinate of the center is an average value of the X-coordinates of pixels of the object, and a Y-coordinate of the center is an average value of the Y-coordinates of pixels of the object.

The radius calculating module 520 is used for calculating a radius R of the scan circle for scanning the image. The radius R is calculated via following formula: $R=\sqrt{N/K}$; wherein N represents the number of the pixels of the object, K is a predetermined constant, for example, $\pi$, 3.5, or $0.9\pi$.

The address module 530 is coupled to the radius calculating module 520 and the center calculating module 510 for determining the address of pixels, which are going to be scanned along the scan circle, stored in the image storage unit 540. The address module 530 includes a position calculate unit 532 and an address calculate unit 534.

The position calculate unit 532 is connected to the counter 580. The counter 580 is configured for generating binary numbers, wherein the length of the binary numbers is determined by the number of pixels that is going to be scanned. For example, if it is preset that the number of pixels that is going to be scanned along the scan circle is 2048, the length of the binary numbers is eleven bits, since $2^{11}=2048$. The position calculate unit 532 receives the binary numbers for calculating horizontal deviations (dx) and vertical deviations (dy) from the center of the pixels corresponding to the binary numbers.

The position calculate unit 532 includes a lookup table 5322, a first position unit 5324, a second position unit 5326, and a mapping unit 5328. The lookup table 5322 is coupled to the counter 580 for storing sine values and cosine values corresponding to the binary numbers. Because the calculation of a sine value or cosine value is complex and requires a period of time, thus storing the actual sine and cosine values will accelerate the identification of the object. In order to reduce the capacity of the lookup table 5322, only sine and cosine values of the central angle corresponding to the first quadrant are stored in the lookup table. Thus the capacity of the lookup table 5322 can be reduce to ¼ of the capacity that stores four quadrants of the sine values and cosine values. Correspondingly, the higher two bits of the binary numeral can be used to represent the four quadrants respectively, and the lower nine bits of the binary numeral are used to correspond to sine values and cosine values in the first quadrant.

The first position unit 5324 is connected to the lookup table 5322 for receiving the cosine value and calculating the horizontal deviation (dx) in the first quadrant, wherein dx equals to radius R multiplied by the cosine value of the center angle. The second position unit 5326 is connected to the lookup table 5322 for receiving the sine value and calculating the vertical deviation (dy) in the first quadrant, wherein dy equals to radius R multiplies the sine value of the center angle.

The mapping unit 5328 is coupled to the first position unit 5324 and the second position unit 5326 for receiving the horizontal deviation (dx) and the vertical deviation (dy) in the first quadrant and generating the horizontal deviation (dx) and the vertical deviation (dy) in the four quadrants. The relation of mapping is shown in the following table:

| Higher two bits of the binary number | Quadrant | dx | dy |
| --- | --- | --- | --- |
| 00 | First quadrant | R * cosθ | R * sinθ |
| 01 | Second quadrant | −R * sinθ | R * cosθ |
| 10 | Third quadrant | −R * cosθ | −R * sinθ |
| 11 | Fourth quadrant | R * sinθ | −R * cosθ |

The address calculate unit 534 is coupled to the mapping unit 5328 for calculating the address of the pixel that is going to be scanned along the circumference of the scan circle. The address of the pixel in the image storage unit 540 can be determined according to the following formula:

$$A = A0 + dx + dy*W;$$

wherein A represents the address of the pixel that is going to be scanned, A0 represents the address of the center in the image storage unit 540, dx represents the horizontal deviation from the center, dy represents the vertical deviation from the center, and W is a width of the image.

The image storage unit 540 is configured for storing image data of the image having the object that is going to be identified, for example, storing image data of the image 10 in FIG. 5.

The scanned data storage unit 550 is coupled to the image storage unit 540 and the counter 580 for receiving the scanned data and the binary number. The scanned data are values of pixels read from the image storage unit 540 according to the addresses of the pixels. The scanned data are matched with the binary number.

The predefined data storage unit 560 is used for storing predefined data of some objects, such as triangle, rectangle, polygon, etc.

The comparing unit 570 is connected to the scanned data storage unit 550 and the predefined data storage unit 560 for comparing the scanned data with the predefined data to identify the object in the image. For example, if the scanned data are illustrated as the graph in FIG. 10, and the predefined data include the aggregate illustrated as the graph in FIG. 6, the object in the image will be identified as a triangle with a rotated angle relative to the object 12 in FIG. 5.

The object in the image is identified by scanning the image along the circumference of the scan circle and comparing the scanned data with predefined data, thus comparing the image with a standard image pixel by pixel is avoid and the speed of identifying the object is expedite.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for identifying an object in an image of a storage unit, the method comprising:
    determining a center of the object;
    calculating a radius for scanning the image based on the numbers of the pixels of the object and a predefined constant;
    scanning along a scan circle defined by the center and the radius to obtain scanned data based on the position relationship between the object and the scan circle;
    comparing the scanned data with predefined data in the storage unit; and
    identifying the object to be a predefined object having the predefined data if the scanned data is the same as the predefined data.

2. The method as claimed in claim 1, wherein the step of determining the center of the object comprises steps of:
    calculating an average value of X-coordinates of pixels of the object as an X-coordinate of the center;
    calculating an average value of Y-coordinates of pixels of the object as a Y-coordinate of the center; and
    determining the center of the object according to the X-coordinate and the Y-coordinate of the center.

3. The method as claimed in claim 1, wherein the radius is calculated via the following formula: $R=\sqrt{N/K}$; wherein N represents a number of pixels of the object, K is a predetermined constant.

4. The method as claimed in claim 1, wherein the step of scanning comprises steps of:
    determining locations of pixels of the object which are going to be scanned and the scan circle; and
    reading values of the pixels as the scanned data.

5. The method as claimed in claim 4, wherein the locations of the pixels are determined according to the following formula: $A=A0+dx+dy*W$; wherein A represents the locations of the pixels, A0 represents a location of the center, dx represents a horizontal deviation from the center, dy represents a vertical deviation from the center, and W is a width of the image.

6. A system for identifying an object in an image, the system comprising:
    a center calculating module for calculating a center of the object;
    a radius calculating module for calculating a radius for scanning the image based on the numbers of the pixels of the object and a predetermined constant;
    an address module for determining addresses of pixels to be scanned along a scan circle defined by the center and the radius, and obtaining scanned data based on the position relationship between the object and the scan circle;
    an image storage unit configured for storing image data of the image;
    a scanned data storage unit coupled to the image storage unit for receiving the scanned data;
    a predefined data storage unit for storing predefined data of predefined objects; and
    a comparing unit connected to the scanned data storage unit and the predefined data unit for comparing the scanned data with the predefined data, and identifying the object in the image to be the similar to one of the predefined objects if the scanned data is the same as the predefined data of one of the predefined objects.

7. The system as claimed in claim 6, wherein the center calculating module is configured for calculating an average value of X-coordinates of pixels of the object as an X-coordinate of the center and an average value of Y-coordinates of pixels of the object as a Y-coordinate of the center; and outputting an address of the center of the object according to the X-coordinate and the Y-coordinate of the center.

8. The system as claimed in claim 7, wherein the radius calculating module calculates the radius via the following formula: $R=\sqrt{N/K}$; wherein N represents a number of pixels of the object, K is a predetermined constant.

9. The system as claimed in claim 8, wherein the address module comprises an address calculate unit for calculating the addresses of the pixels to be scanned according to the address of the center and deviations from the pixels to the center.

10. The system as claimed in claim 9, wherein the addresses of the pixels are determined according to the following formula: $A=A0+dx+dy*W$; wherein A represents the addresses of the pixels, A0 represents the address of the center, dx represents a horizontal deviation from the center, dy represents a vertical deviation from the center, and W is a width of the image.

11. The system as claimed in claim 10, wherein the address module further comprises a position calculate unit for calculating the deviations.

12. The system as claimed in claim 11, further comprising a counter for generating a binary number according to a number of the pixels.

13. The system as claimed in claim 12, wherein the position calculate unit comprises a lookup table coupled to the counter for storing sine values and cosine values corresponding to the binary numbers.

14. The system as claimed in claim 13, wherein the position calculate unit further comprises a first position unit connected to the lookup table for receiving the cosine value and calculating the horizontal deviation in the first quadrant of the scan circle.

15. The system as claimed in claim 14, wherein the position calculate unit further comprises a second position unit connected to the lookup table for receiving the sine value and calculating the vertical deviation in the first quadrant of the scan circle.

16. The system as claimed in claim 15, wherein the position calculate unit further comprises a mapping unit coupled to the first position unit and the second position unit for receiving the horizontal deviation and the vertical deviation in the first quadrant and generating the horizontal deviation and the vertical deviation in four quadrants of the scan circle.

17. The method as claimed in claim 3, wherein the radius includes a first radius and a second radius, the constant of the first radius are different from the constant K of the second radius.

18. The method as claimed in claim 4, wherein the scanned data are the aggregate of the scanned values; if the object and the scan circle are intersected, the scanned value is 1; if the scan circle is a part of the background, the scanned value is 0.

19. The system as claimed in claim 6, wherein the scanned data are the aggregate of the scanned values; if the object and the scan circle are intersected, the scanned value is 1; if the scan circle is a part of the background, the scanned value is 0.

* * * * *